United States Patent [19]
Ye

[11] Patent Number: 5,473,465
[45] Date of Patent: Dec. 5, 1995

[54] OPTICAL ROTATOR AND ROTATION-ANGLE-VARIABLE HALF-WAVEPLATE ROTATOR

[76] Inventor: Chun Ye, Koulukuja 7 A 8, FIN-87300 Kajaani, Finland

[21] Appl. No.: 267,114

[22] Filed: Jun. 24, 1994

[51] Int. Cl.[6] ........................................ G02F 1/01
[52] U.S. Cl. ...................... 359/246; 359/251; 359/484
[58] Field of Search ................................. 359/246, 250, 359/251, 483, 484

[56] References Cited

U.S. PATENT DOCUMENTS

| | | | |
|---|---|---|---|
| 3,438,878 | 2/1976 | Fox | 350/150 |
| 4,331,891 | 5/1982 | Rizzo | 307/427 |
| 4,919,522 | 4/1990 | Nelson | 350/389 |
| 5,187,603 | 2/1993 | Box | 359/73 |

OTHER PUBLICATIONS

Polarized Light In Optics And Spectroscopy, David S. Kliger, et al. pp. 281–285.
Ellipsometry and Polarized Light, R. M. A. Azzam et al. (North Holland New York 1988) pp. 76–77.
Polarized Light and Optical Measurement, D. Clarke et al. (Pergamon Press, Oxford, 1971) pp. 76–87.
Modulation And Switching Of Light In Dieletric Waveguides, T. Tamir et al. (Springer–Veriag, Berlin, 1975) pp. 152–155, 164–167, 192–195.

*Primary Examiner*—Mark Hellner
*Attorney, Agent, or Firm*—Kane, Dalsimer, Sullivan, Kurucz, Levy, Eisele and Richard

[57] ABSTRACT

The device of the present invention for an optical rotator and a half-waveplate rotator comprises a retarder or polarization modulator interposed between two crossed or parallel quarter-wave plates, depending on being used as optical rotator or half-waveplate rotator, oriented such that the fast or slow axis of the retarder or modulator is at angle of 45° relative to fast or slow axes of the quarter-wave plates. The rotation angle of the optical rotator and half-waveplate rotator is equal to one-half the retardance of the retarder or modulator and electrically adjustable when using a polarization modulator.

9 Claims, 1 Drawing Sheet

OPTICAL ROTATOR AND ROTATION-ANGLE-VARIABLE HALF-WAVEPLATE ROTATOR

REFERENCES CITED

BOOKS

R. M. A. Azzam and N. M. Mashara, *Ellipsometry and Polarized Light* (North-Holland, N.Y., 1988).

D. Clarke and J. F. Grainger, *Polarized Light and Optical Measurement* (Pergamon Press, Oxford, 1971).

J. M. Hammer, "Modulation and Swiching of Light in Dielectric Waveguides," in *Integrated Optics*, T. Tamir, ed. (Springer-Verlag, Berlin, 1975), Chap. 4. D. S. Kliger, J. W, Lewis, and C. E. Randall, *Polarized Light in Optics and Spectroscopy* (Academic Press, Harcourt Brace Jovanovich, 1990).

FIELD OF THE INVENTION

This invention relates to optical rotator or circular retarder and polarization rotator of half-wave plate in the fields of polarized light. More particularly, the present invention is directed to optical rotator and half-wave plate rotator whose rotation angles are electrically adjustable. The present invention also relates to a new method for rotating a linearly or an elliptically polarized light.

BACKGROUND OF THE INVENTION

In the area of polarization optics rotator is one basic element and it is essentially important because in a polarization-optical system polarized light and polarizing element are both characterized by their azimuths or orientation angles. The most important rotator is optical rotator or circular retarder. An element of a device whose Jones matrix (cf. R. C. Jones, J. Opt. Soc. Amer. 31, 1941, p. 488–493) R is of the form $$R = \begin{bmatrix} \cos\alpha & \sin\alpha \\ -\sin\alpha & \cos\alpha \end{bmatrix} \quad (1)$$

is defined as an optical rotator or a circular retarder (cf. R. M. A. Azzam and N. M. Mashara, *Ellipsometry and Polarized Light*, North-Holland, N.Y. 1988), where $\alpha$ the rotation angle. The phenomenon described by Equation (1) is also known as optical activity. The state of polarization of a light beam is altered when it is reflected, scattered or propagated through a medium which exhibits either optical activity or birefringence.

In general, an element or a device that can rotate the vibration plane of a linearly polarized light a certain amount without affecting its other properties is called a polarization rotator. Half-wave plate rotator is the simplest polarization rotator, but it is widely employed. For a linearly polarized incident light whose vibration plane makes an angle $\rho$ related to the fast or slow axis of a half-wave plate, the vibration plane of the emergent beam from this half-wave plate will be rotated through an angle of $2\rho$. To adjust the rotation angle $2\rho$, it is necessary to rotate the half-wave plate with respect to the input polarization plane. Requirement of mechanical adjustment of the rotation angle of the half-waveplate rotator restricts its application. This weakness is especially undesirable for some applications, for example, when a half-wave plate is followed by a polarization beamsplitter for making a variable ratio beamsplitter for linearly polarized monochromatic input. Because the ratio of the two emergent orthogonal beam irradiances from the beamsplitter are determined by the rotation angle of the half-wave plate, an electrically controllable inertialess adjustment of the rotation angle should be very desirable in this case.

Another kind of polarization rotator is Sénarmont rotator. A Sénarmont rotator consists of a retarder followed by a quarter-wave plate whose fast or slow axis is oriented with an angle of 45° related to the the fast axis of the retarder. A Sénarmont rotator will rotate the vibration plane of a linearly polarized light aligned to be parallel to the fast or slow axis of the quarter-wave plate through an angle equal to one-half the retardance of the retarder. By simply replacing this retarder with a polarization modulator or variable retarder, a continous polarization rotation can be accomplished. An application limitation for the Sérotator is that the vibration plane of the incident light must be oriented parallel to the fast or slow axis of the quarter-wave plate. Moreover, as a polarization rotator it is only suitable for rotating a linearly polarized light.

Faraday rotator, which is made based on the Faraday effect, is a special kind of rotator and can be used as a polarization rotator, too. The rotation angle of a Faraday rotator is proportional to the so-called Verdet constant, the intensity of the magnetic field and the path length of light beam through the rotator. By varying the intensity of the magnetic field a continuous variation of the rotation angle is to be performed. The difference of the Faraday effect from the optical activity lies in the fact that when a linearly polarized light travels through a Faraday rotator and is reflected back along its own path, the Faraday rotation is cumulative, since its sense is dependent on the direction of light propagation, while in the same case the sense of a rotation due to optical activity is independent on the direction of description, thus the resultant rotation will be exactly cancelled out (cf. D. Clarke and J. F. Grainger, *Polarized Light and Optical Measurement* (Pergamon Press, Oxford, 1971)).

From the viewpoint of applications the main weakness of the Faraday rotator is that the magneto-optic materials are generally not transparent in the visible regions and have thus fund more use only in the near-infrared and infrared regions (cf. J. M. Hammer, "Modulation and Switching of Light in Dielectric Waveguides," in *Integrated Optics*, T. Tamir, ed. (Springer-Verlag, Berlin, 1975), Chap. 4.). Even in these spectral regions, many materials with large Faraday rotations still strongly absorb light. The other disadvantages with Faraday rotators are the temperature- and frequency-dependence of the Verdet constant and the magnetic hysteresis effect. Compared with a polarization rotator, an optical rotator has much wider applicability range, because Equation (1) physically describes a rotation coordinate transformation exactly. Optical rotator can find applications in all the fields in which polarized light is used, especially in optical ellipsometry and polarimetry. An optical rotator can be used for rotating not only a linearly polarized light but also an elliptically polarized light. Furthermore, it can be used for rotation of the reference axis of a polarizing element or device such as polarizer, waveplate and polarization modulator. This potential application of optical rotator is of particular importance because it will enable inertialess and photoelectrically controllable change of the azimuths of polarizing elements or devices. On the other hand, unlike a polarization rotator, an optical rotator is rotation-coordinate-independent (this feature can be easily proved from Equation (1)). This advantage of the optical rotator will enable its convenient usage without any coordinate alignment restriction related to the polarized light or polarizing element that it associates with. However, the presently available opt rotators, which are plates being made of quarz crystal exhibiting circular birefringence (e.g. CVI Laser Corporation, Albuquerque, N. Mex. U.S.A.), can be used only for a special angle of rotation. The fixed angle of rotation restricts their applications very much.

SUMMERY OF THE INVENTION

It is an object of this invention to provide a solution for constructing a variable technical realization of optical rotator. Another object of the present invention is to provide a device for making a half-waveplate rotator whose rotation angle is electrically adjustable without mechanical motion.

The device in accordance with the invention comprises a retarder or polarization modulator and two quarter-wave plates. They are disposed in such a way that the retarder or modulator is interposed between quarter-wave plates with its fast or slow axis making an is at angle of 45° relative to the fast axes of the quarter-wave plates. The device will act as an optical rotator or a half-waveplate rotator when the fast axes of the two quarter-wave plates are crossed or parallel. The rotation angle of the optical rotator and the half-waveplate rotator is equal to one-half the retardance of the retarder or modulator and electrically adjustable when using a polarization modulator.

The optical-rotator arrangement of the present invention, whose Jones matrix should be of the form of Equation (1), enables a rotation both of a linearly polarized light and an elliptically polarized light without affecting their other properties. Moreover, the device of the optical-rotator arrangement of the present invention is applicable for inertialess rotation of a polarizing element such as polarizer, waveplate and polarization modulator by inserting this element between two such devices with the equal rotation angles, but opposite rotation sense. As an optical rotator the present invention can not only offer wider applicability than any existing polarization rotators, but also eliminate their limitations in applications due to the feature of its rotation-coordinate-independence. The half-waveplate arrangement of the invention is suitable for the use as a half-waveplate rotator whose rotation angle is electrically controllable.

The modulator required for constructing the rotator device according to the present invention may be either electro-optically or photoelaticaily or magnetically operated; electro-optical operation is very preferred. Other polarization control element or device, for example variable retarder, can be also used to replace the modulator. The device of the invention is suitable for use under the illumination of a monochromatic or quasi-monochromatic light. A source of the illumination shall provide light that is preferably of a single wavelength or as close to monochromatic as it is feasible to obtain. Such a source may be a laser of the type that emits light that is principally of one wavelength. It is unnecessary that the emitted light be coherent.

"Jones matrix" refers to the 2×2 matrix developed by R. C. Jones in J. Opt. Soc. Amer. 31, 1941, p. 488–493 for handling the interaction of polarized light and optical devices. The term "retarder" refers to "linear retarder" that is defined as an optical element that divides an incident monochromatic polarized light into two orthogonal, linear polarization components and introduces a relative retardance or phase shift between them. "Fast axis" or "slow axis" of a retarder refer to one of the directions or axes of the just-mentioned two orthogonal, linear polarization components along which the refractive index is smaller or higher. "Retardance" of a retarder refers to the just-mentioned relative retardance of phase shift. "Quarter-wave plate" refers to a retarder that has a constant retardance equal to 90° or $\pi/2$. "Half-wave plate" refers to a retarder that has a constant retardance equal to 180° or $\pi$. "Polarization modulator" or "variable retarder" refers to a retarder whose retardance is controllable, usually by using an electrical signal.

DETAILED DESCRIPTION OF THE PREFERRED EMBODIMENT

Figure 1:
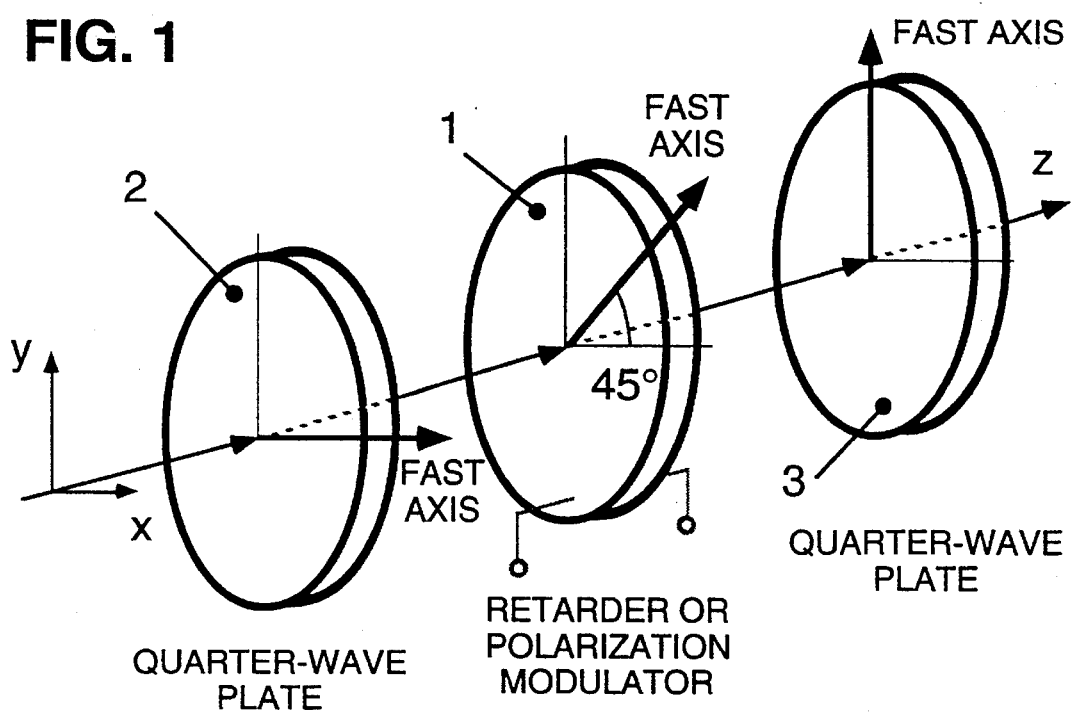
FIG. 1 depicts the arrangement of an optical rotator in accordance with the present invention.

FIG. 1 schematically illustrates the optical-rotator arrangement of the device in accordance with the present invention, in which a retarder or polarization modulator 1 is interposed between two crossed quarter-wave plates 2 and 3, whose fast axes are perpendicular to each other and each at an angle of 45° relative to the fast axis of the retarder or modulator 1. An input light beam propagates in the z direction and passes through the quarter-wave plate 2, the retarder or modulator 1 and the quarter-wave plate 3. Without loss of generality it is assumed that the fast axis of the quarter-wave plate 2 is parallel to the x coordinate axis, whereas the axis of the quarter-wave plate 3 is perpendicular to it and that the retarder or modulator 1 has a retardance $\Delta$ and the orientation angle of its fast axis is at angle of 45° relative to the x axis. Herein the retardance of a retarder or modulator is given by $\Delta = 2\pi.\delta n.d/\lambda$, where $\delta n$ is the birefringence of the retarder or modulator material, d the path length of light beam through it and $\lambda$ the wavelength used.

With the chosen coordinate system the Jones matrix $M(\Delta)$ of the retarder or modulator 1 and the Jones matrices F, S of the quarter-wave plates 2, 3 can be written as (cf. D. S. Kliger, J. W, Lewis, and C. E. Randall, *Polarized light in optics and spectroscopy*, (Academic Press, Harcourt Brace Jovanovich, 1990))

$$M(\Delta) = \begin{bmatrix} \cos\frac{\Delta}{2} & i\sin\frac{\Delta}{2} \\ i\sin\frac{\Delta}{2} & \cos\frac{\Delta}{2} \end{bmatrix}, \quad (2a)$$

$$F = \begin{bmatrix} e^{i\pi/4} & 0 \\ 0 & e^{-i\pi/4} \end{bmatrix}, \quad (2b)$$

$$S = \begin{bmatrix} e^{-i\pi/4} & 0 \\ 0 & e^{i\pi/4} \end{bmatrix}, \quad (2c)$$

where i is the imaginary unit. From Equations (2a), (2b) and (2c) the Jones matrix $T_r$ of the arrangement in FIG. 1 is obtained by $$T_r = S \cdot M(\Delta) \cdot F = i \begin{bmatrix} -i & 0 \\ 0 & 1 \end{bmatrix} \begin{bmatrix} \cos\frac{\Delta}{2} & i\sin\frac{\Delta}{2} \\ i\sin\frac{\Delta}{2} & \cos\frac{\Delta}{2} \end{bmatrix} \begin{bmatrix} 1 & 0 \\ 0 & -1 \end{bmatrix} = \tag{3}$$

$$\begin{bmatrix} \cos\frac{\Delta}{2} & \sin\frac{\Delta}{2} \\ -\sin\frac{\Delta}{2} & \cos\frac{\Delta}{2} \end{bmatrix}.$$

The Jones matrix of Equation (3) is of the form of Equation (1) and, therefore, describes an optical rotator. The rotation angle of this optical rotator is equal to one-half the retardance $\Delta$ of the retarder used. If a modulator instead of a waveplate is used, then the rotation angle of this optical rotator becomes electrically adjustable. Based on Equation (3) it is easy to prove that the same result as Equation (3) will be deduced even if the orientation axes of the retarder or modulator 1 and the quarter-wave plates 2 and 3 in FIG. 1 are at angles of θ+45°, θ and θ+90° relative to the chosen x coordinate axis, respectively.

Figure 2:
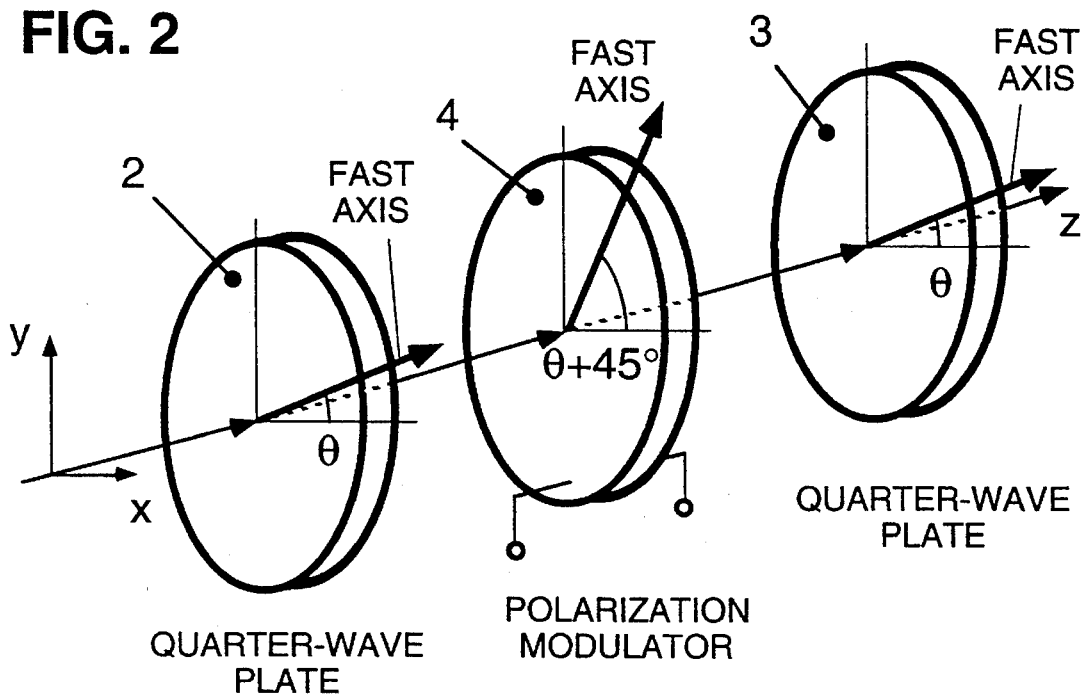
FIG. 2 depicts the arrangement a rotation-angle-variable half-waveplate rotator in accordance with the present invention.

The half-waveplate rotator according to the present invention is depicted in FIG. 2. Because an arrangement for making a half-waveplate with an unadjustable orientation angle technically has no significance, the present invention refers only to a half-waveplate rotator with an adjustable rotation angle. The half-waveplate rotator of the invention consists of a polarization modulator 4 interposed between two quarter-wave plates 2 and 3. The fast axes of the quarter-wave plates 2 and 3 are parallel to each other and the fast axis of the modulator 4 is at an angle of 45° related to them. An input light beam propagates in the z direction and passes through the quarter-wave plate 2, the modulator 4 and the quarter-wave plate 3. For a general case it is assumed that the fast axes of the quarter-wave plates 2 and 3 are at angle of θ from the x coordinate axis, whereas the modulator 4 has an azimuth of θ+45° relative to the x axis. Thus the Jones matrix $T_{\lambda/2}$ of the arrangement in FIG. 2 can be calculated as follows $$T_{\lambda/2} = i \begin{bmatrix} \cos\theta & -\sin\theta \\ \sin\theta & \cos\theta \end{bmatrix} \begin{bmatrix} 1 & 0 \\ 0 & -i \end{bmatrix} \begin{bmatrix} \cos\frac{\Delta}{2} & i\sin\frac{\Delta}{2} \\ i\sin\frac{\Delta}{2} & \cos\frac{\Delta}{2} \end{bmatrix} \begin{bmatrix} 1 & 0 \\ 0 & -i \end{bmatrix} \begin{bmatrix} \cos\theta & \sin\theta \\ -\sin\theta & \cos\theta \end{bmatrix} = i \begin{bmatrix} \cos\left(2\theta + \frac{\Delta}{2}\right) & \sin\left(2\theta + \frac{\Delta}{2}\right) \\ \sin\left(2\theta + \frac{\Delta}{2}\right) & -\cos\left(2\theta + \frac{\Delta}{2}\right) \end{bmatrix}, \tag{4}$$

where $\Delta$ is the retardance of the modulator 4. Ignoring the factor i outside the matrix in Equation (4) that has no contribution to the intensity, Equation (4) describes a half-wave plate. The orientation angle of this half-wave plate is determined by the orientation angle θ of the quarter wave plates of the rotator device in the chosen coordinate system and the retardance $\Delta$ of the modulator used. It is equal to (θ+$\Delta$/4). Changing the retardance $\Delta$ of the modulator by varying its control signal the orientation angle of this half-wave rotator will be electrically changed. For a linearly polarized light beam incident on this half-wave plate rotator with its polarization plane parallel to the x axis, the polarization plane of the emergent light from the rotator will be rotated through an angle of 2θ+$\Delta$2. Because of the existing bias part θ it is convenient to choose the desired range in which the rotation angle should be varied. When $\Delta$=0, the device is degenerated into a half-wave plate assembled by a pair of identically oriented quarter-wave plates. In the special case of θ=0 the rotation angle $\Delta$/2 of the rotator device is determined only by the retardance $\Delta$ of the modulator.

A change of the rotation direction of the optical rotator in FIG. 1 or the half-waveplate rotator in FIG. 2 occurs when the fast axes of the two quarter-wave plates are rotated together by 90° around the light propagation direction relative to the retarder or modulator. The rotation direction can be also changed through sign change of the retardance of the retarder or modulator. Using these methods it is easy and convenient to obtain a pair of optical rotators with opposite rotation directions, i.e. a right and left optical rotator, which are very desirable for the most applications, and to obtain a rotation-angle-variable half-waveplate rotator with changeable rotation direction.

In addition to manufacturing variable optical rotator and half-waveplate rotator, the principle of the present invention can be directly used for rotating a linearly or an elliptically polarized light. The Polarized light to be rotated should sequentially pass through a quarter-wave plate, a retarder or polarization modulator and another quarter-wave plate, which are arranged according to the rules described in the claims below.

What is claimed is:

1. In an optical system with a monochromatic or quasi-monochromatic illumination a rotator device comprising a retarder or polarization modulator and two quarter-wave plates, wherein said retarder or polarization modulator and said quarter-wave plates are oriented in cascade with said retarder or polarization modulator interposed between said quarter-wave plates.

2. The device according to claim 1, wherein the rotator is an optical-rotator in which the fast or slow axes of said quarter-wave plates are perpendicular to each other and each at an angle of 45° with respect to the fast or slow axis of said retarder or polarization modulator.

3. The device as claimed in claim 2, wherein the optical rotator is defined by the Jones matrix $T_r$ according to the following formula $$T_r = \begin{bmatrix} \cos\frac{\Delta}{2} & \sin\frac{\Delta}{2} \\ -\sin\frac{\Delta}{2} & \cos\frac{\Delta}{2} \end{bmatrix},$$

where $\Delta$ is the retardance of said retarder or polarization modulator and $\Delta$/2 the rotation angle of the optical rotator.

4. The device according to claim 1, wherein the rotator is a half-waveplate rotator in which the fast axes of said quarter-wave plates are parallel to each other and they are at an angle of 45° with respect to the fast or slow axis of said retarder or polarization modulator.

5. The device as claimed in claim 4, wherein the half-waveplate rotator is defined by the Jones matrix $T_{\lambda/2}$ according to the following formula $$T_{\lambda/2} = \begin{bmatrix} \cos\left(2\theta + \frac{\Delta}{2}\right) & \sin\left(2\theta + \frac{\Delta}{2}\right) \\ \sin\left(2\theta + \frac{\Delta}{2}\right) & -\cos\left(2\theta + \frac{\Delta}{2}\right) \end{bmatrix},$$

where $\theta$ is the orientation angle of the quarter-wave plates of the half-waveplate rotator in the chosen coordinate system and $\Delta$ the retardance of said retarder or polarization modulator.

6. Variations of the rotator device according to claim 1, wherein said retarder or polarization modulator and said quarter-wave plates are substituted by their corresponding fiber-optical and/or integrated optical product(s) and wherein said polarization modulator is replaced by the other polarization control elements or their fiber-optical and/or integrated product(s).

7. The rotator device according to claims 1, wherein its rotation direction is changed by rotating said retarder or polarization modulator by 90° around the light propagation direction with respect to said quarter-wave plates or by changing the sign of the retardance of said retarder or polarization modulator.

8. The device as claimed in claim 1, wherein said modulator is electro-optically or photoelastically operated and preferably electro-optically operated.

9. A method for rotating a polarized light beam from a monochromatic or quasi-monochromatic illumination comprising the steps of:

propagating and passing said polarized light beam sequentially through a first quarter-wave plate, a retarder or polarization modulator and a second quarter-wave plate;

orientating said retarder or polarization modulator such that its fast or slow axis is at an angle of 45° related to that of said first quarter-wave plate; and orienting said second quarter-wave plate such that the fast axis of second quarter-wave plate is perpendicular or parallel to that of said first quarter-wave plate if said polarized light beam is linearly polarized or perpendicular to that of said first quarter-wave plate if said polarized light is elliptically polarized.

* * * * *